United States Patent [19]

Kokui et al.

[11] Patent Number: 5,228,942
[45] Date of Patent: Jul. 20, 1993

[54] BAND WINDING APPARATUS FOR FORMING A BEAD CORE

[75] Inventors: Kazuhisa Kokui, Miki; Tsuyoshi Okazaki, Takatsukasa, both of Japan

[73] Assignee: Nakata Zoki Co., Ltd., Japan

[21] Appl. No.: 759,563

[22] Filed: Sep. 13, 1991

[51] Int. Cl.⁵ .............................................. B29D 30/48
[52] U.S. Cl. .................................... 156/422; 156/415; 156/420
[58] Field of Search ............ 156/136, 422, 405.1, 156/406.4, 414, 415, 416, 417, 420; 245/1.5, 110, 124; 242/117

[56] References Cited

U.S. PATENT DOCUMENTS

| | | | |
|---|---|---|---|
| 1,866,391 | 7/1932 | Bostwich | 156/415 |
| 1,946,449 | 2/1934 | Williams | 156/415 |
| 2,151,306 | 3/1939 | Shook | 156/422 |
| 3,051,221 | 8/1962 | Strozewski | 156/422 |
| 3,429,765 | 2/1969 | Mallory et al. | 156/422 |
| 4,457,802 | 7/1984 | Yanagihara et al. | 156/405.1 |
| 4,547,251 | 10/1985 | Landsness | 156/415 |
| 4,959,109 | 9/1990 | Swain et al. | 156/405.1 |

FOREIGN PATENT DOCUMENTS

| | | |
|---|---|---|
| 0283423 | 9/1988 | European Pat. Off. . |
| 2205476 | 8/1973 | Fed. Rep. of Germany . |
| 1447603 | 6/1966 | France . |
| 58-68425 | 4/1983 | Japan . |
| 0054841 | 3/1985 | Japan .................... 156/405.1 |
| 790883 | 2/1958 | United Kingdom . |
| 0930348 | 7/1963 | United Kingdom ............ 156/422 |
| 2065069 | 6/1981 | United Kingdom . |

*Primary Examiner*—Geoffrey L. Knable
*Assistant Examiner*—Nancy T. Krawczyk
*Attorney, Agent, or Firm*—Stevens, Davis, Miller & Mosher

[57] ABSTRACT

A band winding apparatus for forming a bead core comprises a winding device which is composed of a drum and holding means. The drum is rotatably supported by a support shaft and has a peripheral surface on which a band for forming a bead core is wound. The holding means are installed in the drum and has a holding surface capable of detachably adsorbing a start end of the band outside in the drum's radial direction. The holding surface is arranged approximately flush with the peripheral surface of the drum.

7 Claims, 12 Drawing Sheets

BAND WINDING APPARATUS FOR FORMING A BEAD CORE

BACKGROUND OF THE INVENTION

The present invention relates to a band winding apparatus for forming a bead core which can wind a band smoothly in a true roundness without causing bending of folding at its start end.

In a pneumatic tire, for example as shown in FIG. 15, an annular head core (d) is provided in each of a tire's bead parts (a). The bead core (d) is formed by multiple winding of a band (e) along the circumference of a drum (f) as shown in FIG. 17.

When winding such band (e) about the drum (f), a start end (g) of the band (e) was, conventionally, fixed by a clamp (j) as shown in FIG. 18, wherein a cavity (h) is formed on the circumference of the drum (f) and the clamp (j) is mounted in the cavity (h) so as to act within the cavity (h).

Therefore, after winding, the start end (g) projects by clamping from the inner circumference of the bead core (d). When such the bead core (d) with an irregular inner circumferential surface is applied to a tire, the position of the bead core (d) may be deviated from the tire center. And the tire quality is lowered so as to decrease steering stability.

In particular, when metal cores such as steel cords are used in the band (d), the start end (g) is deformed permanently, and perfect repair of such deformation becomes impossible.

SUMMARY OF THE INVENTION

It is hence a primary object of the invention to present a band winding apparatus which can wind the band without the need for a projection of the start end.

Accordingly to one aspect of the present invention, a band winding apparatus comprises a winding device which is composed of a drum and a holding means. The drum is supported rotatably by a support shaft and has a peripheral surface on which a band is wound so as to form a bead core. The holding means means is installed in the drum and has a holding surface capable of detachably holding a start end of the band outside in the drum's radial direction. And The holding surface of the holding means is arranged approximately flush with the peripheral surface of the drum.

When the band contains metallic cords made of magnetic material the holding means may comprise of a magnet with in the drum for attracting or repelling the band. And the drum may have expanding means for expanding or contracting the diameter of the drum.

BRIEF DESCRIPTION OF THE DRAWINGS

An embodiment of the present invention will now be described by way of example, referring to the attached drawings, in which.

DETAILED DESCRIPTION OF A PREFERRED EMBODIMENT

Figure 1:
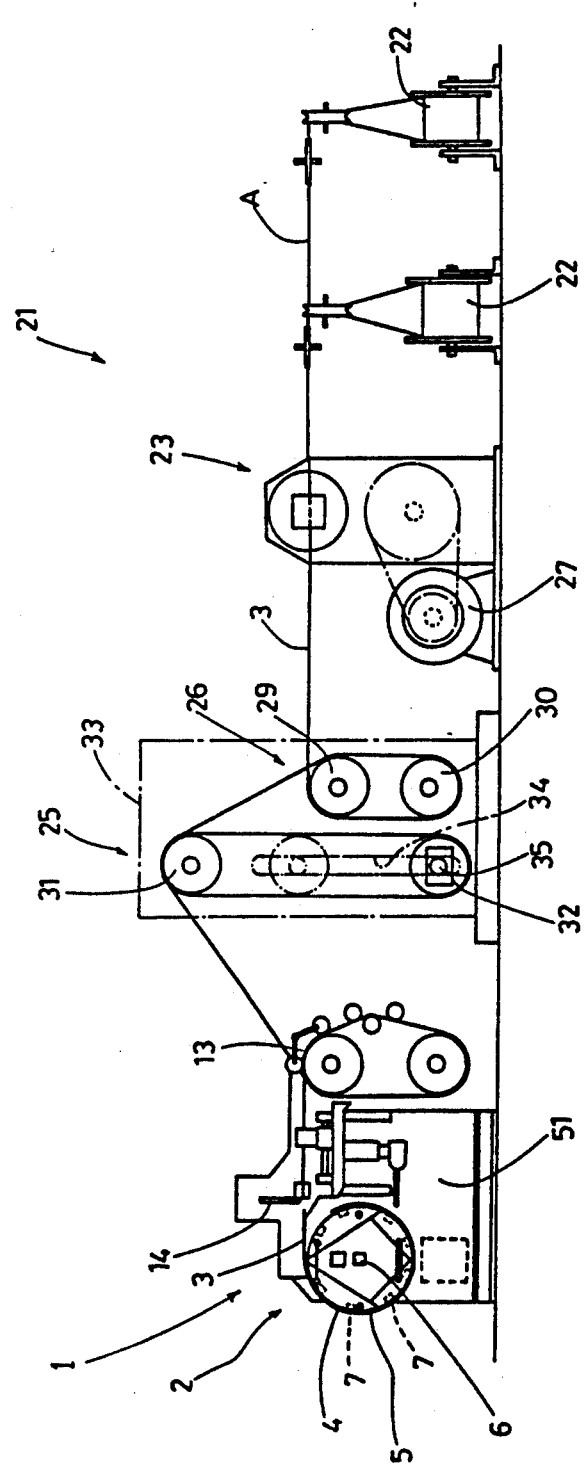
FIG. 1 is a front view showing an embodiment of the invention.
Figure 2:
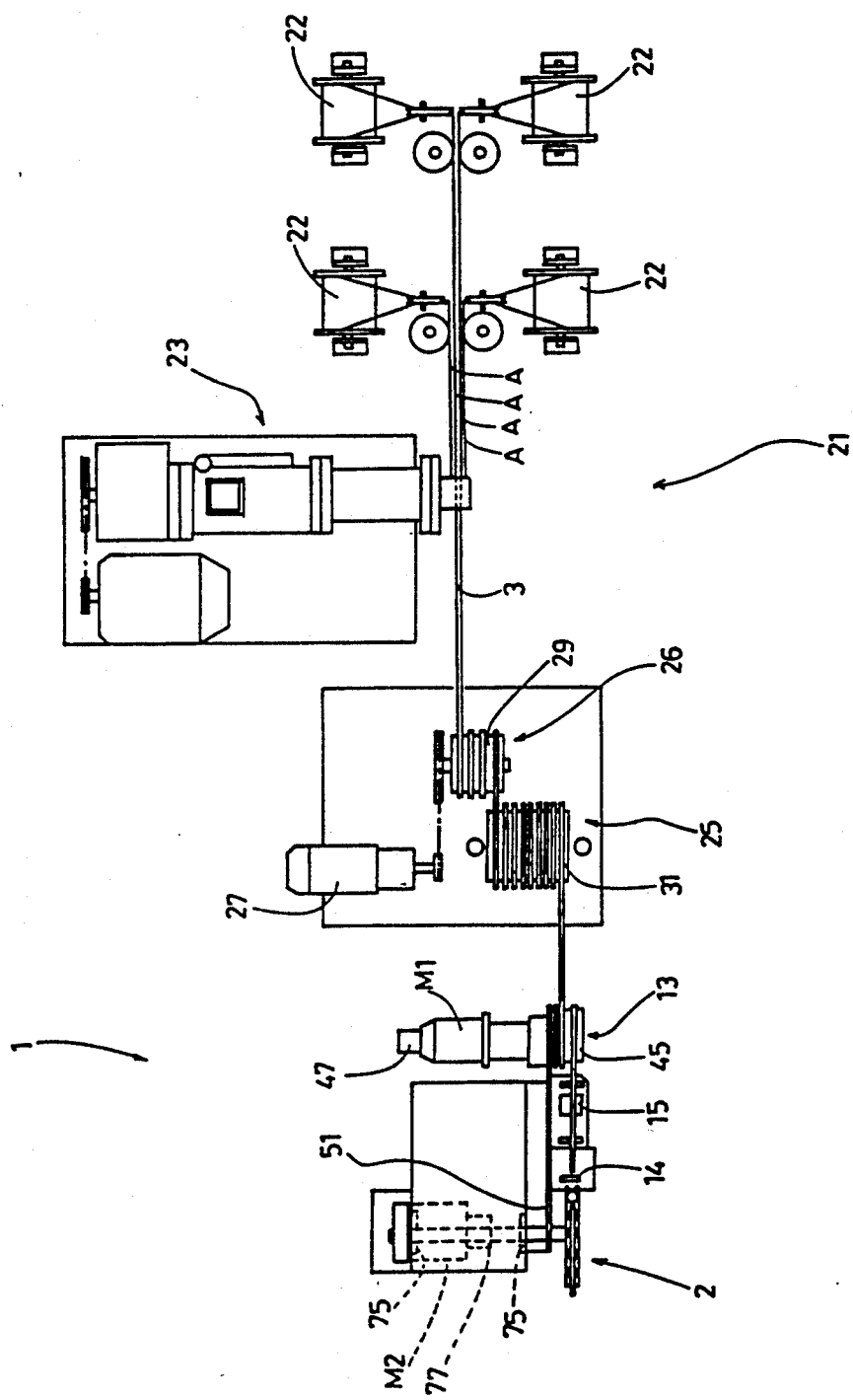
FIG. 2 is a plan view of the embodiment shown in FIG. 1.
Figure 3:
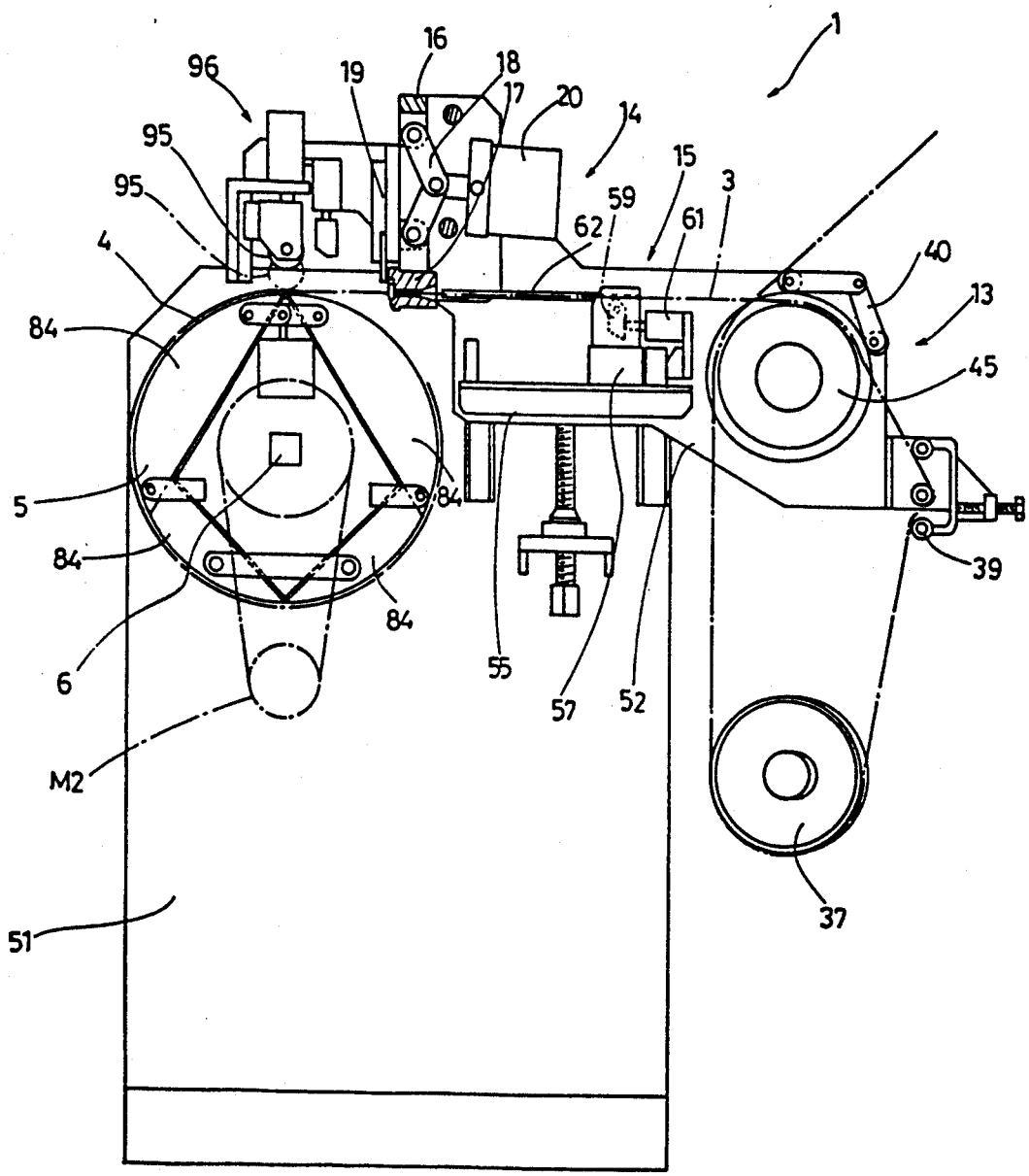
FIG. 3 is a an enlarged portion of FIG. 1 showing front view of a portion of the band winding apparatus.

In FIGS. 1 and 2, a productive system of bead core constructed with a band forming apparatus 21, a stockyard 25 and a band winding apparatus 1 of the invention is disclosed, wherein: the band winding apparatus 1 comprises a winding device 2, sensing means 13 and cutting tool 14; the winding device 2 has a drum 5 rotatably supported by a support shaft 6; and holding means 7 is provided on the periphery 4 of the drum 5.

Figure 16:
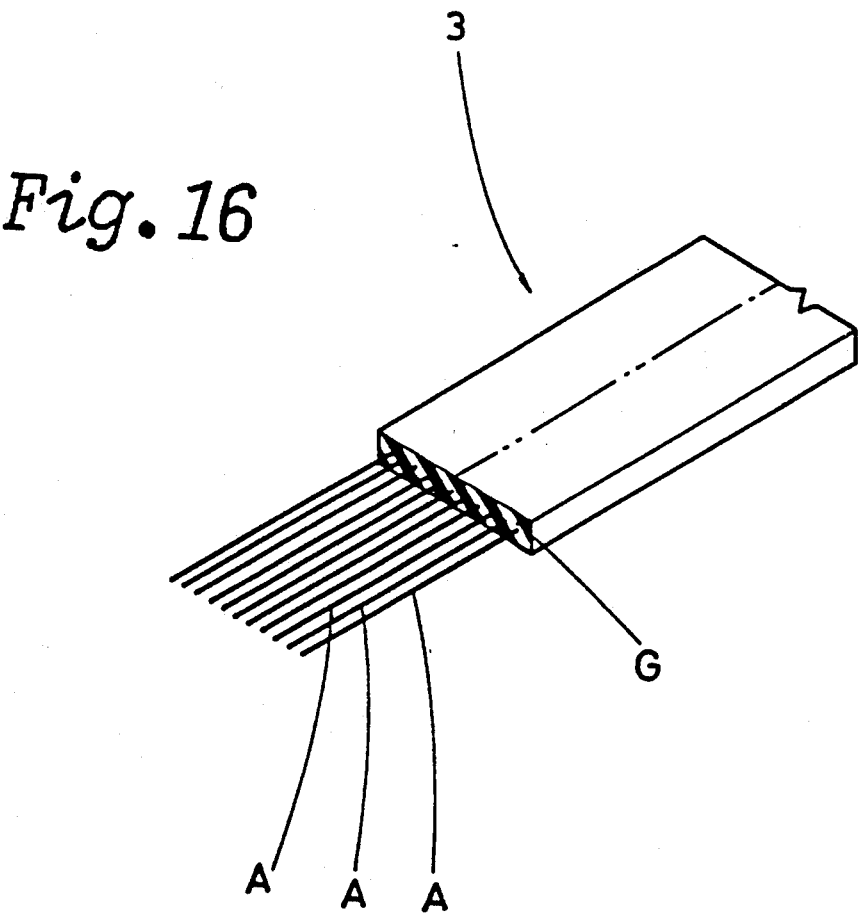
FIG. 16 is a perspective view showing a portion of a band.
Figure 17:
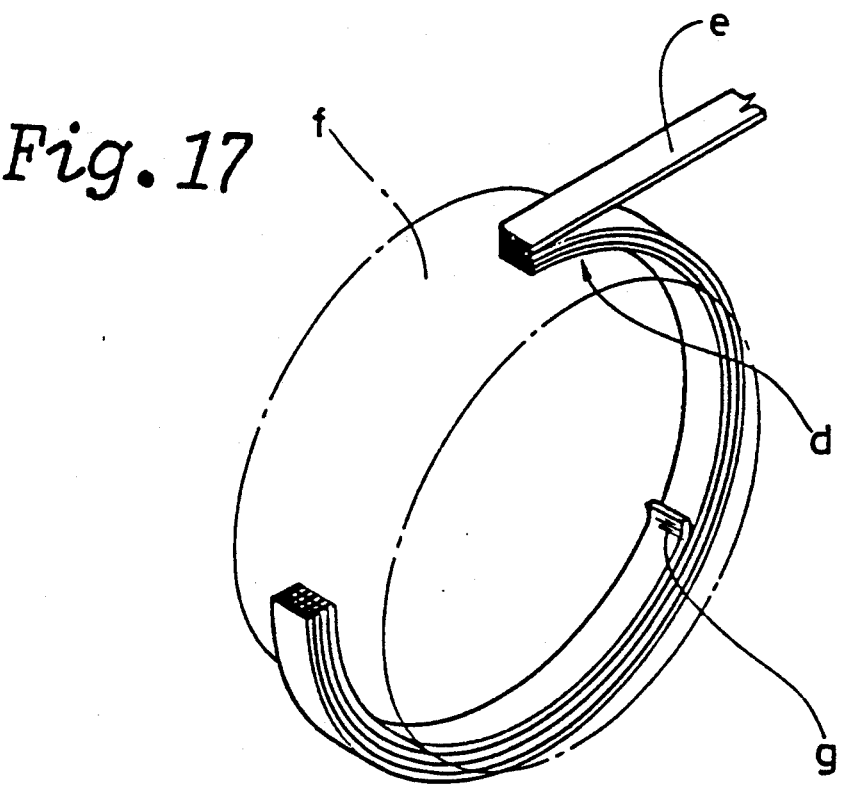
FIG. 17 is a perspective view showing a prior art band winding apparatus.
Figure 18:
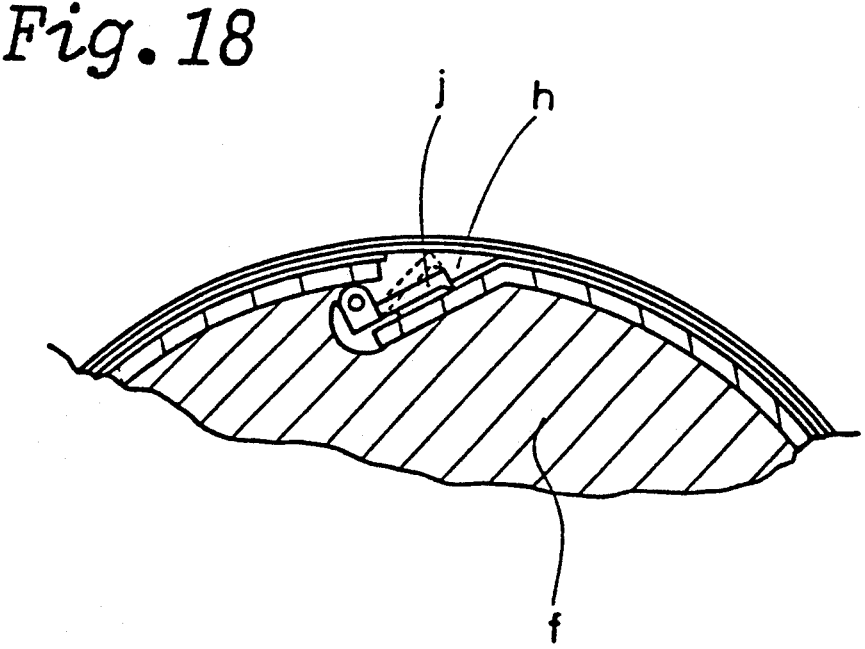
FIG. 18 is a perspective view showing another example of the prior art.

A band 3 is composed of a plurality of cords A arranged in parallel to each other and covered with rubber G, as shown in FIG. 16.

In this embodiment, above mentioned band 3 is formed with the band forming apparatus 21, and the bead core(d) is formed by winding the band 3 on the drum 5 with the winding device 2 of the band winding apparatus 1. And the sensing means 13 measure the winding length of the band 3, and the cutting tool 14 cuts the band 3 according to the length measured by the sensing means 13.

The band forming apparatus 21 comprises plural cord reels 22 for winding and accumulating the bead cords A, and an extruder 23 for forming the band 3 by fusing rubber G on the outside of the arrangement of the bead cords A, while extruding the band 3 toward the band winding apparatus 1.

In the embodiment, the cords A are formed by drawing the magnetic metal such as steel and nickel. And the cords A are wound on the reels 22, and the tips of the cords A are aligned and inserted into the extruder 23. Rubber material fluidized by heating is supplied into the extruder 23, and by covering the parallel arrangement of cords A passing through the extruder 23 with rubber, the band 3 having a flat section with a plurality of cords A is formed. This band 3 is continuously sent out toward the band winding apparatus 1.

Between the band forming apparatus 21 and the band winding apparatus 1, the stockyard 25 which is capable of pooling there is a band 3 over a length to be corresponding to the band length wound on the drum 5.

The stockyard 25 has a pull roll 26 for pulling the band 3 extruded from the extruder 23. The pull roll 26 comprises an upper roller 29 driven by a driver 27 composed of an electric motor or a hydraulic motor, and a lower roller 30 disposed beneath the upper roller 39. The band 3 is wound several times, straddling over the upper and lower rollers 29, 30, The stockyard 25, also, has an upper first roller 31 and a lower second roller 32 at the downstream side of the pull roll 26. And each roller 31, 32 is pivoted on a support stand 33, and the lower second roller 32 is fitted with a shaft 35 guided in a straight groove 34 extending vertically.

By winding the band 3 sequentially on the first, second and first rollers 31, 32, 31, the stored length between the first and second rollers 31, 32 is elongated or contracted together with the vertical motion of the second roller 32. The extruder 23 may be operated continuously at constant speed regardless of starting or stoping of the band winding apparatus 1 by such elongation or contraction. In the preferred embodiment, the band 3 is wound several times between the first and second rollers 31, 32, and the stored amount of the band 3 is increased. Meanwhile, the first and second rollers 31, 32 may be formed as roller groups disposing a plurality of rollers.

Referring to FIG. 2, the sensing means 13 is disposed at the downstream side of the stockyard 25, and comprises: a measuring roller 45 on which the band 3 is wound; a first motor M1 for driving the measuring roller 45, a pulse generator 47 rotating in synchronism with the first motor M1; a controller 48 (FIG. 12) for controlling the pulses generated by the pulse generator 47; an arithmetic unit 49 for operating the output of the pulse generator 47; and reference setting tool 50 for setting the reference length for cutting the band 3, storing it, and delivering the set value to the arithmetic unit 49.

As the first motor M1 is driven, the passing length of the band 3 passing over the measuring roller 45 may be measured by the pulse the generator 47.

In the preferred embodiment, beneath the measuring roller 5, an idle roller 37 is disposed. And a tension 39 for preventing slack of the band 3 by pressing the band 3 orthogonally to its running direction is disposed between the measuring roller 45 and the idle roller 37. By providing such tensioner 39, the band 3 is brought in contact with the measuring roller 45, and the measuring precision is enhanced.

In the case that plurality of band winding apparatus 1 are adopted in this system, a longitudinal cutting tool 40 capable of dividing the band 3 into a plurality of band strips (corresponding to the number of the apparatuses 1 by cutting the band 3 longitudinally) may be installed along the circumference of the measuring roller 45.

At the downstream side of the sensing means 13, a cutter 14 as cutting means for cutting the band 3, and feeding means 15 for sending out the band 3 to the cutter 14 disposed between the cuter 14 and sensing means 13 are provided.

Figure 4:
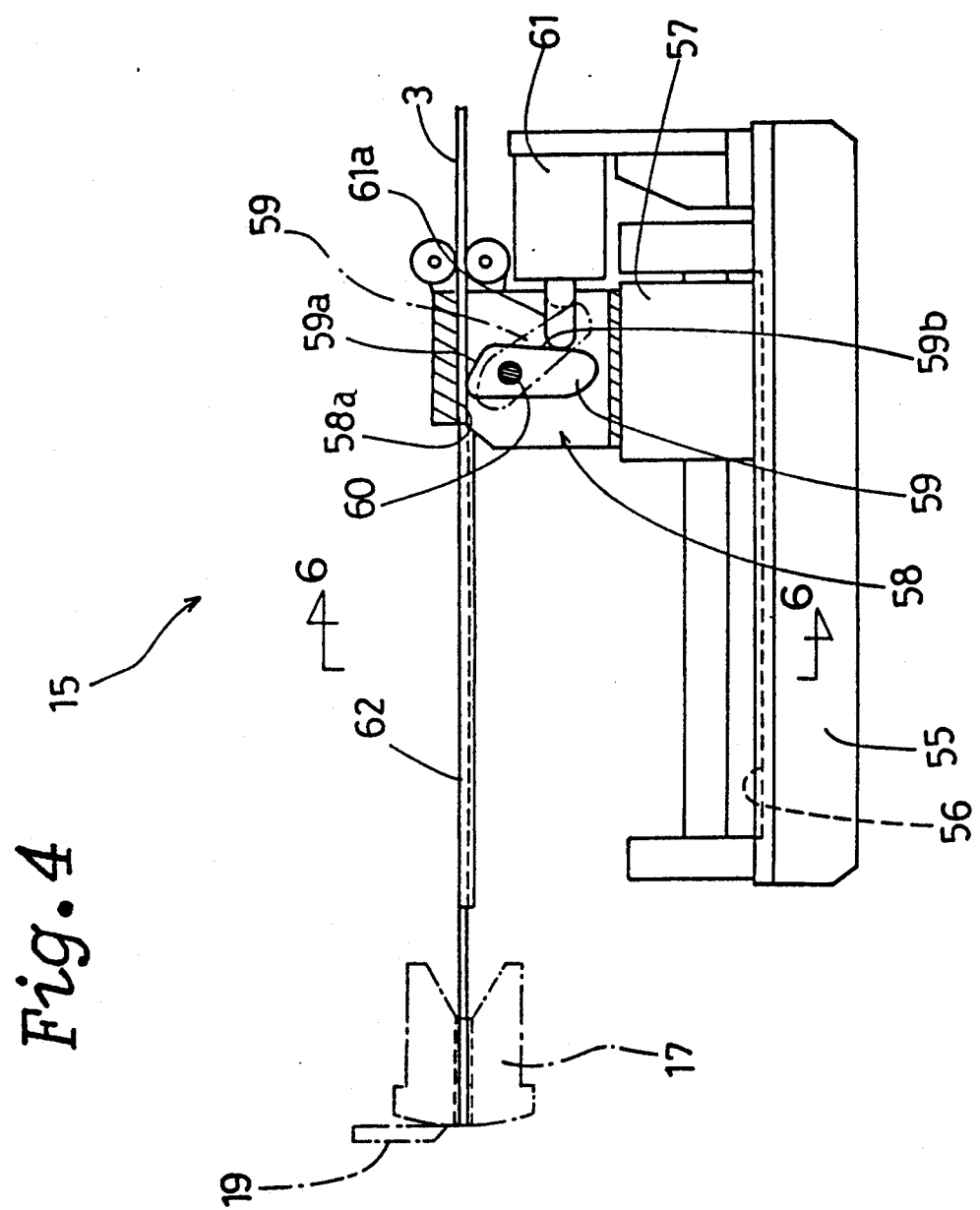
FIG. 4 is a front view showing an example of a feeding means.
Figure 5:
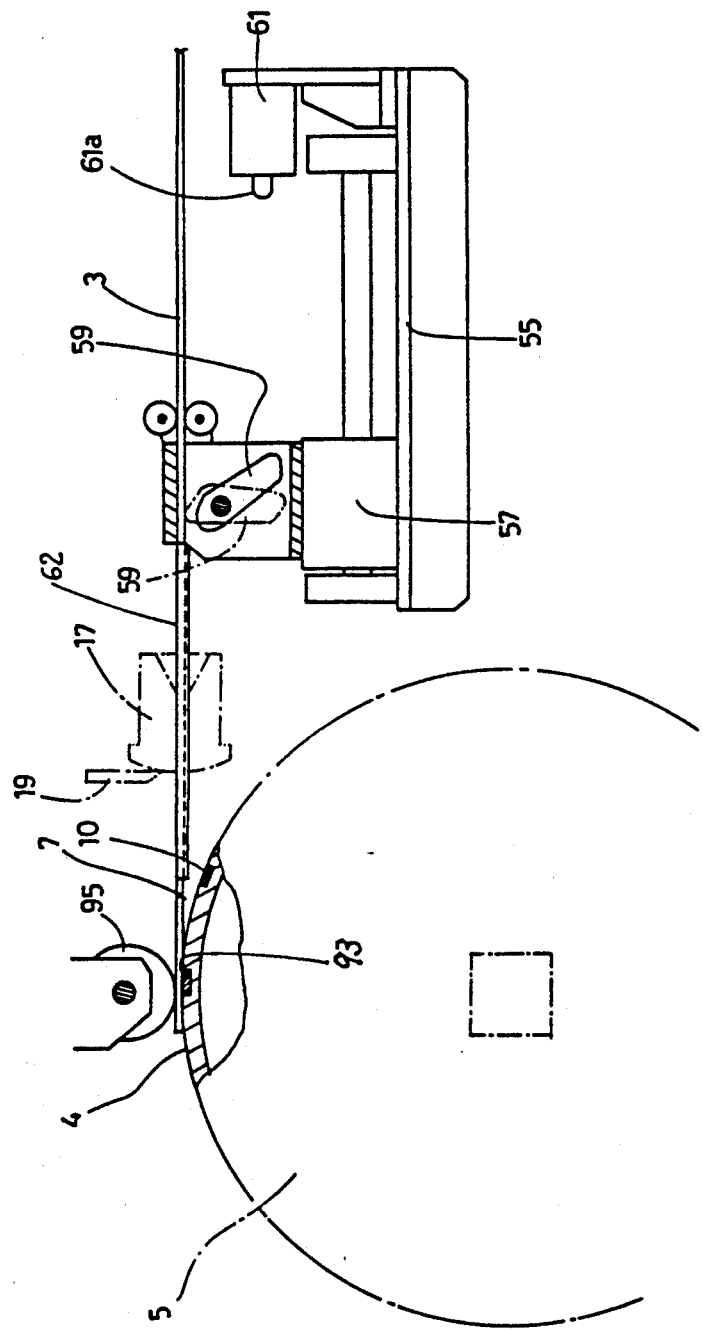
FIG. 5 is a front view explaining the action of the feeding means.
Figure 6:
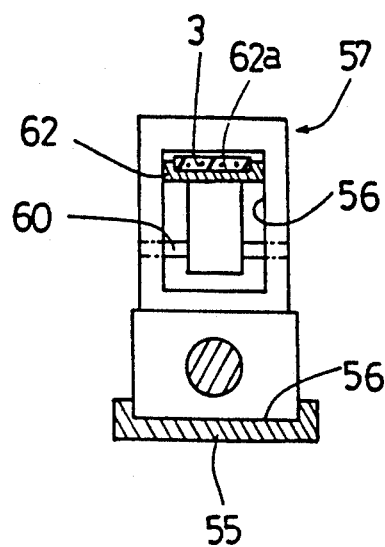
FIG. 6 is sectional view taken along the line 6—6 of FIG. 4.

The feeding means 15 is, as shown in FIGS. 4, 5, 6, provided with a moving tool 57 which is guided and moved by a groove 58 extending in the same direction as the band 3, on a base 55 mounted on a moving frame 52 elevatably supported on a base frame 51.

The moving tool 57 is capable of reciprocating along the groove 56, for example, by a reciprocal motion device such as rodless air cylinder.

The moving tool 57 is provided with a hole 58 which extends in the running direction of the band 3 and has a contact surface 58a with the band 3 and a. And a stopping piece 59 for engaging and disengaging the moving tool 57 and band 3 is provided in the hole 58.

The stopping piece 59 is an eccentric cam which is pivotally supported by a pin 60 arranged squarely into the running direction of the band 3. And the stopping piece 59 has a slope 59a including back downward on the upper surface, and an abutting surface 59b for abutting against the rod 61b of the air cylinder 61 on the rear side surface.

This stopping piece 59 is turned as the rod 61a of the air cylinder 61 presses on the abutting surface 59b, and by this turning, the slope 59a is largely inclined so that the band 3 may be pressed and fixed against the contact surface 58a of the hole 58.

By contraction of the cylinder 61, the stopping piece 59 is cleared of pressing force, and the engagement of the band 3 and moving tool 57 is canceled by a gap formed between the band 3 and slope 59a.

The moving tool 57 is provided with a long guide piece 60 which has a groove 62a (FIG. 6) receiving the band 3 from beneath and extends to the vicinity of the cutting tool 14.

Therefore, the moving tool 57 holds the band 3 as the stopping piece 59 presses the band 3 by the extending action of the cylinder 61, and then the band 3 is sent out toward the cutting tool 14 by the forward motion of the moving tool 57, as shown in FIG. 5. On the other hand, by the retreat of the rod 61a, holding of the band 3 is canceled, so that the moving tool 57 may retreat independently.

In this way, the feeding means 15 sends out the band 3 toward the cutting tool 14.

Figure 7:
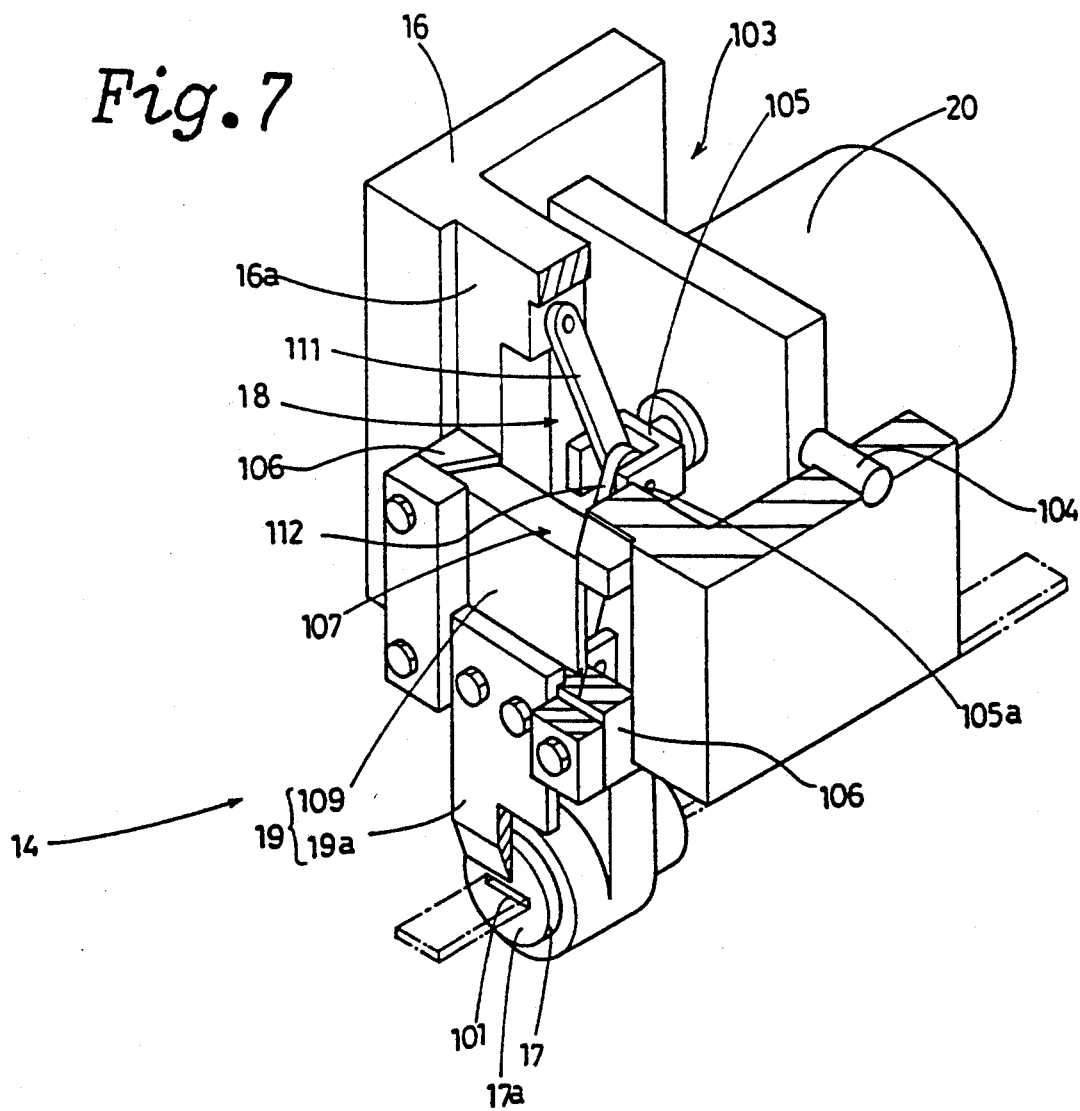
FIG. 7 is a perspective view showing an example of a cutting tool.

The cutting tool 14, as shown in FIG. 7, comprises a base body 16 mounted on the moving frame 52, a lower pattern 17 affixed to the lower part of the base body 16, and an upper pattern 19 moving vertically on the base body 16 and engaged with the lower pattern 17.

The lower pattern 17 is in a tubular form extending in the horizontal direction and having a penetration hole 101 through which the band 3 passes, and a holder 17a is formed at the opening end of the downstream side of the penetration hole 101.

The base body 16 has a cavity 103 opening toward the upstream side, and an expander 20 is installed in the cavity 103. The expander 20 is an air cylinder in this embodiment, and the cylinder base body is rotatably pivoted as the rotary shaft 104 extending horizontally to both sides from the cylinder base body is pivoted by the base body 16. The expander 20 has its rod 105 projected toward the downstream side.

At the downstream side end face 16a of the base body 16, a guide part 107 extending vertically is formed by disposing a pair of L-shaped guide pieces 106, 106 opposite to each other.

Figure 9:
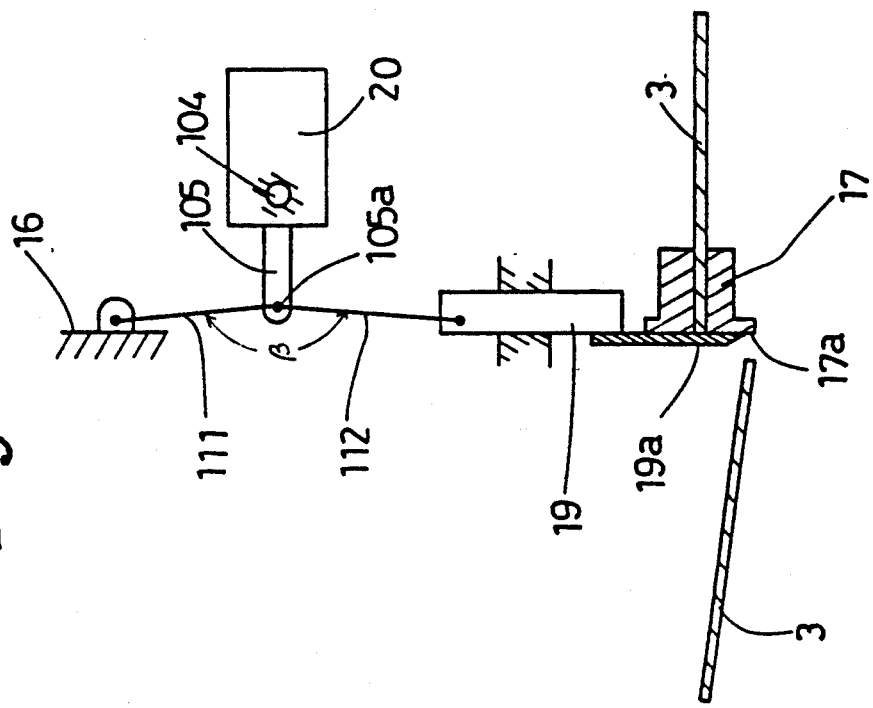
FIGS. 8, 9 are diagrams explaining the action of the cutting tool.
Figure 8:
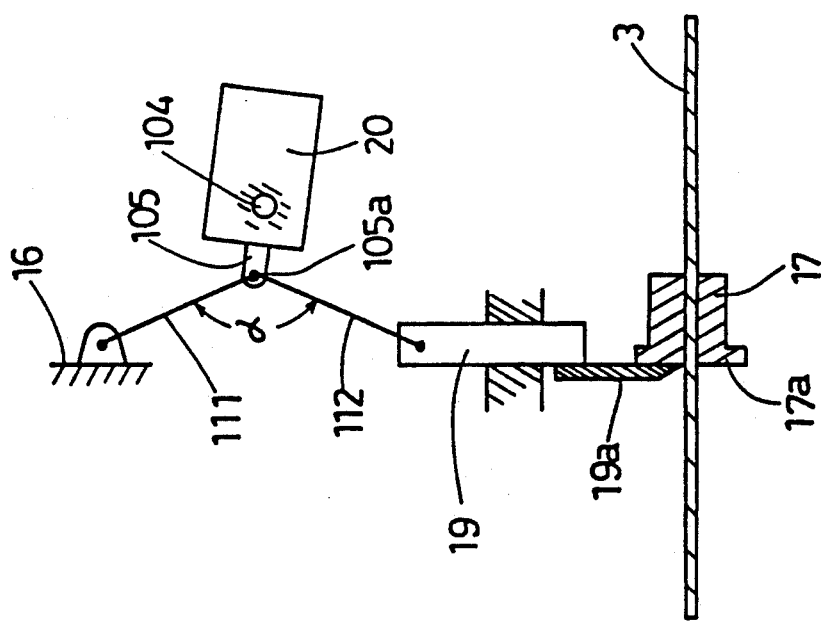

The upper pattern 19 has a sliding part 109 guided by the guide part 107 and a cutter blade 19a mounted on the sliding part 109. Therefore, cutter blade 19a moves up and down along the front end of the holder 17a of the lower pattern 17 as shown in FIGS. 8, 9, and cuts the band 3 passing through the hole 101.

The rod 105 pivots one end of the first link 111 and second link 112, by means of pins 105a.

The other end of the first link 111 is rotatably pinned to the base body 16, and the other end of the second link 112 is rotatably pinned to the upper pattern 19, respectively by means of pins 105a.

By thus connecting the first and second links 111, 112, a toggle mechanism 18 is formed.

By widening the intersection angle α of the first and second links 111, 112 as shown in FIG. 8 in the ascending motion of the upper pattern 19, the intersection angle β may be brought closer to 180 degrees in the descending motion as shown in FIG. 9, and a very large downward force may be transmitted to the upper pattern 19 in this state. Therefore, the output of the expander 20 may be small, and the cutting tool 14 may be reduced in size. Further, the cutting blade 19a descends along the holder 17a, so that the band 3 may be cut precisely without bending the end face. The feeding means 15 can feed out the band 3 to the position close to the cutting position of the cutting tool 14, and the cutting tool 14 can cut the band 3 precisely at specified length by this feeding-out.

Figure 10:
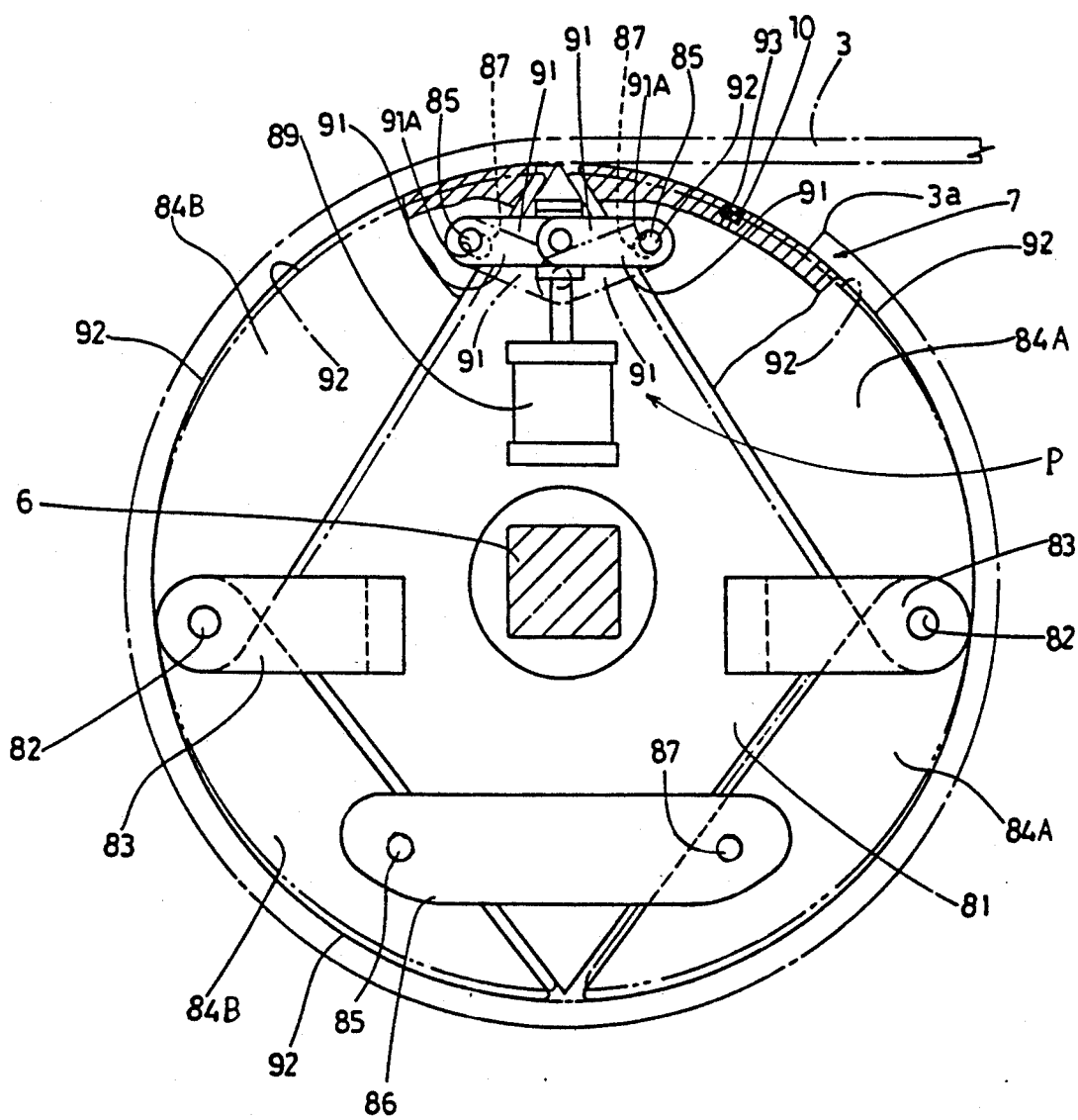
FIG. 10 is a front view showing the drum together with its action.
Figure 11:
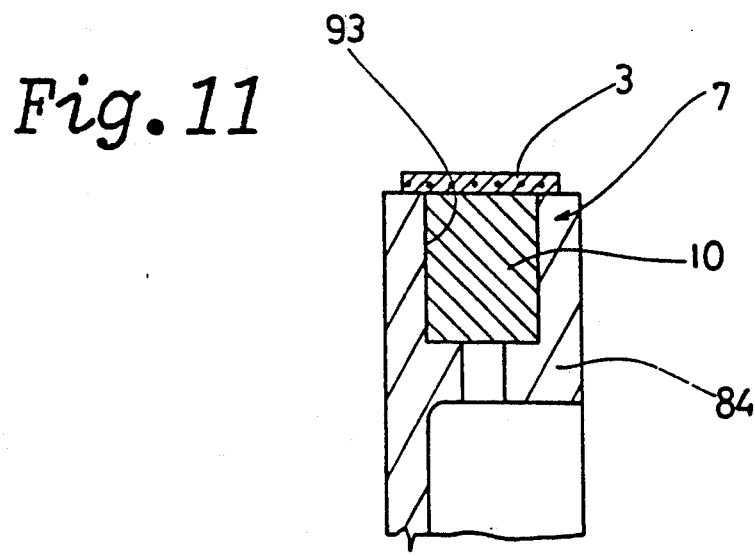
FIG. 11 is a sectional view showing mounting of a magnet.

Referring to FIG. 10, the winding device 2 has a drum 5 and holding means 7.

The drum 5 is mounted on one end of the horizontal support shaft 6 which is rotatably borne on a pair of bearings 75, 75. And the support shaft 6 and a mounting holes of the drum 5 are, both, formed square so as to prevent play and backlash.

The other end of the support shaft 6 is coupled with the output shaft of a second motor (FIG. 2) which is a driver comprising DC motor, DC or AC servo motor, hydraulic motor or other motor and reduction gear. And also, the support shaft 6 is coupled with a pulse generator 77 of the winding device 2 formed similarly to the pulse generator 47 disposed in the sensing means 13.

On the basis of the set value determined by the reference setting tool 50, the output operated at an output arithmetic unit 78 is sent out to a controller 79, and the second motor M2 is controlled at a specific speed according to the set value by the controller 79. Therefore, the controller 79 calculates the output of the reference length set value of the band 3 set by the arithmetic unit 49, and the detection output from the pulse generator 77 of the winding device 2, thereby the motor M2 may be rotated at a specified speed. The detection output of the pulse generator 77 is fed back to the control tool 48 for controlling the measuring roller 45. The second motor M2 is provided with a torque limiter, and the output torque is limited with respect to the changes of the winding diameter of the band 3 wound on the periphery 4 of the drum 5, thereby keeping constant the tension of the band 3 between the first and second motors M1, M2.

As shown in FIG. 10, the drum 5 comprises a diamond shaped central portion 81 which is mounted on the support shaft 6 and four expanding pieces 84A, 84A, 84B, 84B each of which has a partially cut-away circular shape and forms an arc of the circular peripheral surface 4 of the drum 5 and arranged along the respective side of the central portion 81. The expanding pieces 84A, 84B forms the expanding means. The expanding pieces 84A, 84A are connected so as to be capable of pivoting in relation to each other by a pin 82 at the overlapped portion at which one ends of the expanding pieces 84A, 84A overlap each other. In a same way, the expanding pieces 84B, 84B are connected by a pin 82 at the over-lapped portion thereof. The pins 82, 82 are respectively supported on ears 83, 83 each projecting outwardly from an obtuse angle vertex of the substrate 81.

On the other hand, the expanding pieces 84A, 84B, which are located at the lower side in FIG. 10 and adjacent to each other, are connected by a clock link 86 which is fixed on the substrate 81 and holds working pins 85, 85 planted on the expanding pieces 84A, 84B.

Other expanding pieces 84A, 84B located at the upper side in FIG. 10 are also connected by a toggle means P.

The toggle means P is composed of an air cylinder 89 which is mounted on the central portion 81 and has a rod extending outwardly to the acute angle vertex of the diamond shaped central portion 81, and a pair of links bodies 91, 91 each of which is pivotaly connected to the rod of the cylinder 89 at its one end and is pivotaly connected to the expanding piece 84A or 84B at its other end. In this case, working pins 85, 85 of the expanding piece 84A, 84B are inserted into the holes 91A, 91A of the link bodies 91, 91 without play. As the rod of the air cylinder 89 expands or contracts, the expanding pieces 84A, 84B located at the upper side rotates about the pin body 82 so as to approach or retreat from the central portion 81.

When the expanding pieces 84A, 84B are most remote from the central portion 81, surface 92 of expanding pieces 84A, 84B forms a substantially circular arc, and as the expanding pieces 84A, 84B approach the central portion 81, the surface 92 forms a polygonal shape so as to reduce the diameter of the drum 5.

Air intake into the cylinder 89 and exhaust from the cylinder 89 are effected through a rotary joint (not shown herein) which is disposed around the support shaft 6, and the cylinder 89 may be operated even while the drum 5 is rotating.

In this embodiment, the pair of expanding pieces 84A, 84B located at the lower side in FIG. 10 are not reduced in diameter because of connecting with the lock link 86. However, when the large reduction ratio is required, the toggle means P may be used instead of the lock link 86.

The drum 5 has a plurality of circular holes 93 extending in the radial direction of the drum 5, as shown in FIGS. 5 and 10, at nearly equal intervals on the periphery 4.

The adsorption means 7 are mounted in the holes 93.

In this embodiment, the holding means 7 comprises of plurality of cylindrical magnets 10 each inserted into the holes 93, and the outside surface of the each magnet 10 in the drum's radial direction is arranged approximately flush with the peripheral surface 4 of the drum 5. Magnet 10 has a holding effect on its outside surface which can detachably hold the band 3, because the band 3 contains the cords of magnetic metals. Therefore, the outside surface of the magnet 10 acts as a holding surface.

Therefore, the holding means 7 can fix the start end 3a of the band 3 on the periphery 4 of the drum 5 without being folded.

Meanwhile, the magnet 10 may be disposed only on one circumferential position of the periphery 4.

The magnet 10 may be a permanent magnet, on an electromagnet magnetized by electric conduction.

Alternatively, the holding means 7 may comprise intake ports which open in the periphery 4 and have a vacuum effect caused by connection to a vacuum pump. This would be used in the case, where the band 3 contains cords of nonmagnetic organic fibers as reinforcement, instead of metallic cords.

Between the winding device 2 and the cutting tool 14, a feed roller tool 95 for guiding the start end 3a of the band 3 to the periphery 4 of the drum 5 is disposed, and a guide tool 96 for preventing the band 3 from loosening in winding is provided at the outside of the periphery 4 of the drum 5.

The operation of the band winding apparatus 1 in this embodiment is explained below. The operation is conducted in the following steps.

(1) First step

The reference value L of the winding length of the band 3 is calculated in the following equation (1) by the reference value setting tool 50 by feeding the winding diameter D, number of windings N and winding overlap amount C in the reference value setting tool 50.

$$L = \pi \times \sum_{n=1}^{n} \{D + 2 \times T(N - 1)\} + C \quad (1)$$

wherein
D: winding diameter (drum diameter)
T: thickness of band
N: number of windings
C: overlap amount The reference value L of winding length is delivered to the arithmetic unit 49, and the arithmetic unit 49 stores this reference value L, and issues a measurement start signal to the pulse generator 48.

(2) Second step

Both first and second motors M1, M2 are driven. By driving of both motors, the periphery of the measuring roller 45 and the periphery 4 of the drum 5 rotate at same speed. The band 3 moves forward by the reciprocal motion of the moving tool 57, and the pulse generator 48 measures the length of the band 3 passing over the measuring roller 46. On the other hand, the second motor M4 is driven, but the pulse generator 77 of the winding device 2 does not count. Since the second motor M2 contains the torque limiter as mentioned above, the band 3 between the first and second motors M1, M2 is constant in tension, and the band 3 wound on the periphery 4 of the drum 5 is taken up by a uniform winding force approximately. Besides, due to elongation of the rod of the air cylinder 89, the peripheral diameter of the drum 5 is expanded to be equal to the winding inside diameter of the band 3.

(3) Third step

Along with the advancement of the band 3, the start end 3a reaches the periphery 4 of the drum 5, and the start end 3a is attracted to the magnet 10 and stopped on the drum 5. Since the magnet 10 is formed roughly flush with the periphery 4, and the start end 3a is not bend but is fixed on the drum 5 along the periphery 4.

(4) Fourth step

The band 3, with its start end 3a fixed on the drum 5, starts to rotate at the same speed as the drum 5.

(5) Fifth step

The pulse generator 48 keeps measuring as the measuring roller 45 promotes the band 3. In spite of the elevation of the moving speed of the band 3, since the pulse generator 48 is intended to measure the passing length of the band 3, the measuring precision will not be lowered.

(6) Sixth step

As the measuring length of the band 3 by the pulse generator 46 coincides with the preset reference length L, the arithmetic unit 49 stops the first and second motors M1, M2 through the controllers 48, 79, so that the band 3 is also stopped. At the same time, the length measurement of the pulse generator 48 terminates. In this stage, the reference setting tool 50 delivers a cutting signal to the cutting tool 14, and the band 3 is cut to a length equal to the reference length L by the cutting tool 14.

(7) Seventh step

The band 3 at the upstream side of the cutting tool 14 is taken up on the drum 5 up to the terminal end of the band 3 cut off by the cutting tool 14 as the second motor M2 is driven by the output of the controller 79. When taking up the terminal end, meanwhile, by taking up the band 3 by the guide of the guide tool 95, the band 3 may be formed into a highly precise annular form without springing up the terminal end.

Meanwhile, the band 3 at the upstream side of the cutting tool 14 is sent out at a constant speed regardless of whether the band forming device 21 is rotating the winding device 2 although the advancement is stopped by the stop of the first motor M1, and therefore the band 3 remains in the stockyard 25 while the drum 5 is stopped or running at low speed.

(8) Eighth step

Completion of winding up the band 3 is measured and detected by a timer attached to the reference setting tool 50, and the second motor M2 is stopped by the signal output. Simultaneously with actuation of the second motor 2, the expanding means 11 is actuated by the signal output of the controller 79, and by contracting the diameter of the drum 5, the start end 3a of the band 3 is separated from the magnet 10, and the winding device 2 clears holding of the band 3. Therefore, the wound band 3 may be taken out to the side of the drum 5.

After taking out the band 3 from the drum 5, the drum 5 is expanded in diameter, or the expanding completion signal is transmitted 49 to the arithmetic unit 49 through the controller 79.

Thereafter, by repeating the operation of the second to eighth steps, a bead core made of winding of the band 3 is continuously formed.

Figure 12:
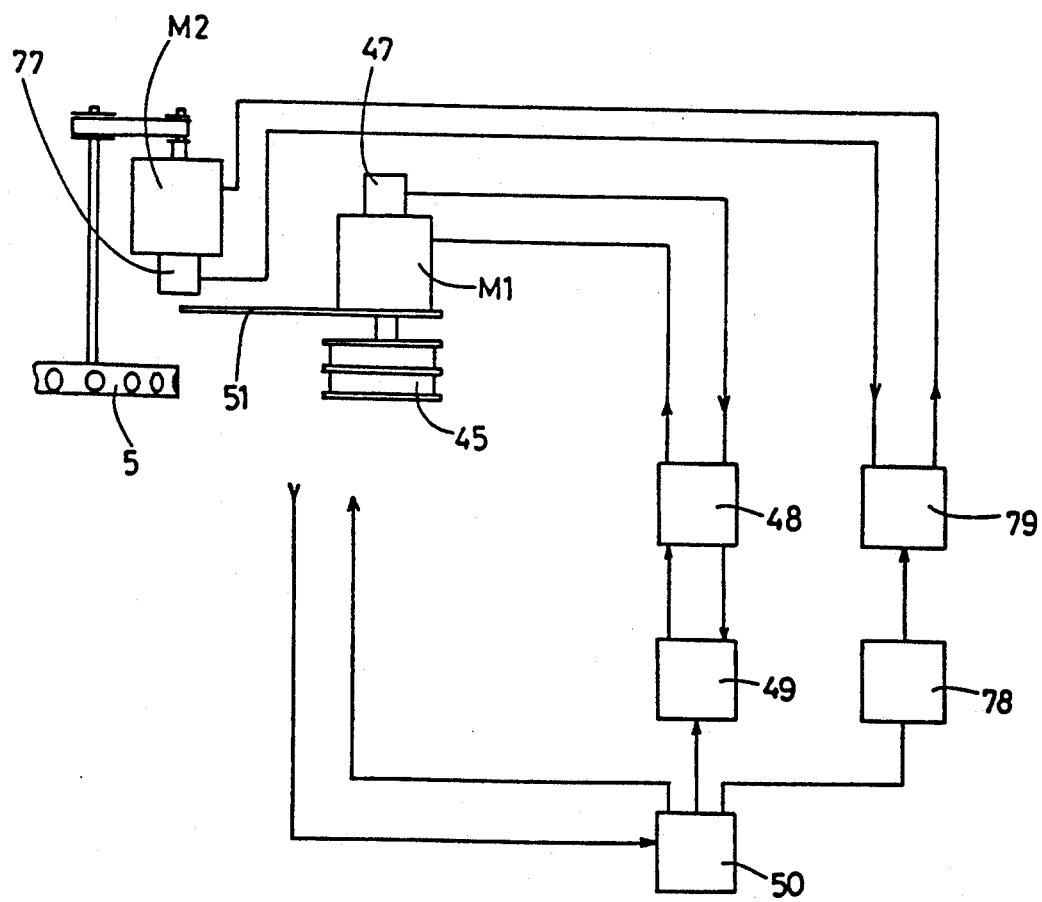
FIG. 12 is a diagram showing the command system.
Figure 13:
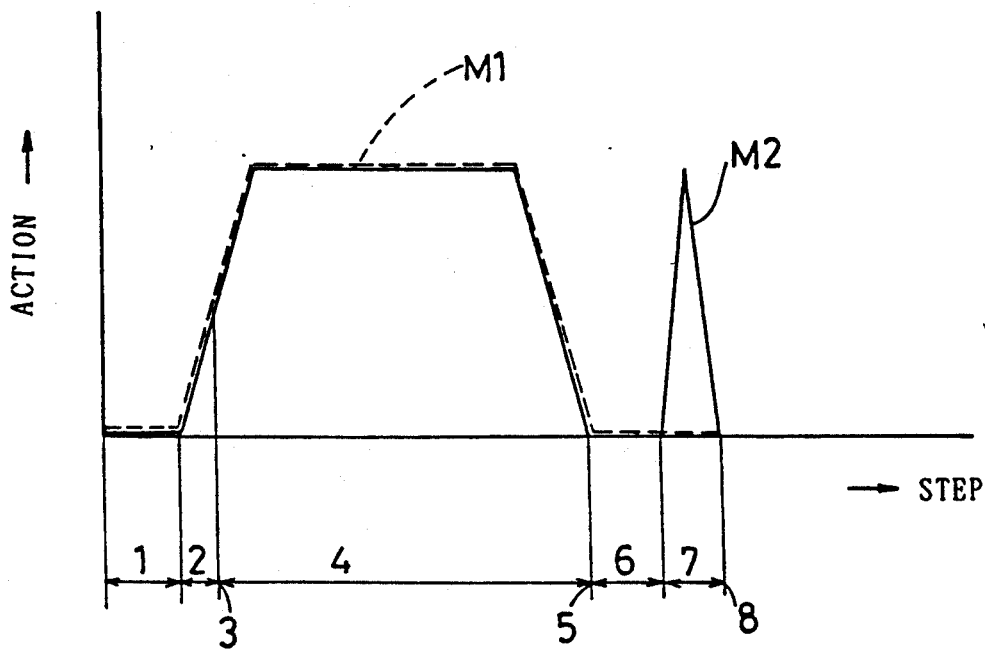
FIG. 13 is a graph showing the operation cycle of the actuating member.
Figure 14:
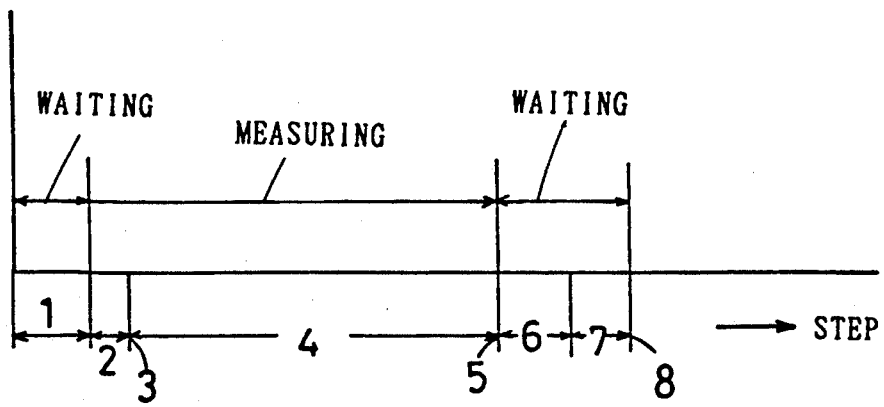
FIG. 14 is a graph showing the operation cycle of its detecting means.
Figure 15:
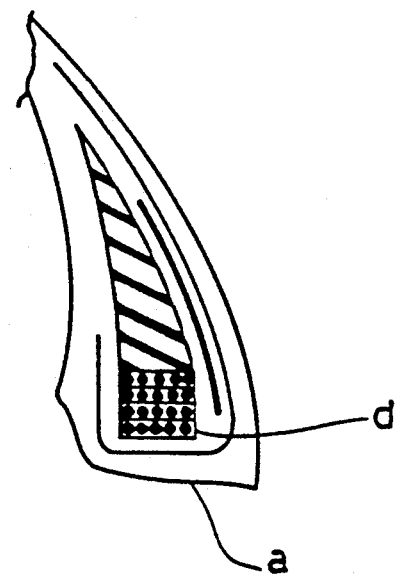
FIG. 15 is a sectional view along a radial plane of a tire showing employing the completed winding of a band in a bead tire member.

Meanwhile, FIG. 12 is a diagram showing the command system, FIG. 13 shows operation cycle of actuation members, and FIG. 14 shows the actuation cycle of detecting means.

As described herein, the band winding apparatus of the invention is provided with holding means having a holding surface arranged flush with the periphery of the drum. Therefore, the start end of the band is wound along, the circumference without being folded, and precision in the winding is enhanced. Therefore, when the bead core formed by the band winding apparatus is employed in a tire, the bead core may be mounted on the tire center without deviation of position, and the quality may be enhanced while increasing the tire strength.

What is claimed is:

1. A band winding apparatus for forming a bead core comprising a winding device which is composed of
   a drum capable of expanding and contracting a diameter of the drum, rotatably supported by a support shaft, and having a peripheral surface on which a band for forming a bead core is wound, and
   holding means installed in the drum and having a holding surface capable of detachably holding a start end of the band on the drum, wherein
   said holding surface is arranged approximately flush with the peripheral surface of the drum
   said drum includes a diamond shaped central portion mounted on the support shaft and four semi-circular expanding pieces each having a partially circular shape so as to form the peripheral surface of the drum and each expanding piece having a rectilinear side, the rectilinear sides of said expanding pieces being arranged along four sides of the diamond shaped central portion, an adjacent two of said expanding pieces comprising a first pair and being pivotally secured to a first pin therebetween and a second two of said expanding pieces comprising a second pair and being pivotally secured to a second pin therebetween;

said first and second pins being located at opposite corners of said diamond shaped central portion;

at least one toggle means interconnecting said first and second pairs of expanding pieces so that movement of said toggle means will pivot said expanding pieces to expand and contact the diameter of said drum.

2. A band winding apparatus for forming a bead core according to claim 1, wherein the band contains metallic cords made of magnetic material, and the holding means has a magnet within the drum for attracting and repelling the band.

3. A band winding apparatus or forming a bead core according to claim 1, wherein a torque limiter for limiting the output torque of a driver driving the drum is provided between the drum and the driver.

4. The apparatus of claim 1 wherein said diamond shaped central portion is defined by four corners, two said corners have acute angles and two said corner having obtuse angles.

5. The apparatus of claim 4 wherein the first and second pins are located at the obtuse angle corners.

6. The apparatus of claim 1 wherein said first pair of expanding pieces overlap each other at said first pin and said second pair of expanding pieces overlap each other at said second pin.

7. The apparatus of claim 1 wherein said toggle means interconnects said first and second pairs at one free end thereof and a link interconnects the first and second pairs at the other free end thereof.

* * * * *